United States Patent Office 3,193,536
Patented July 6, 1965

3,193,536
PROCESS FOR THE PRODUCTION OF
FLUORESCENT POLYMERS
Annemarie Wagner, Otto Bayer, Carlhans Süling, and Heinz Gröne, all of Leverkusen, Germany, assignors to Farbenfabriken Bayer Aktiengesellschaft, Leverkusen, Germany, a corporation of Germany
No Drawing. Filed Sept. 20, 1960, Ser. No. 57,148
Claims priority, application Germany, Sept. 30, 1959, F 29,497
15 Claims. (Cl. 260—79.3)

This invention relates to a process for the production of fluorescent polymers which are built up either wholly or partially of fluorescent monomers.

It is known to incorporate fluorescent compounds into polymeric substances. For example, the white tone of polymers can be improved by the addition of small quantities of blue-fluorescent compounds.

In accordance with the usual processes, the fluorescent compounds of comparatively low molecular weight are intimately mixed in solid form with the polymeric products on mixing rollers, in kneaders or in a similar apparatus. In another process the fluorescent compounds are mixed with the polymeric products in solution. In this way a particularly good dispersion of the fluorescent substance in the polymer is obtained. This latter method is particularly suitable for improving the white tone of polymers which are to be processed to form filaments, fibers, foils or films.

The fluorescent compounds of low molecular weight which have hitherto been employed in the aforementioned processes are either merely mixed with the polymeric substances or are dissolved in the polymers. However, it has been found that the fluorescent compounds of low molecular weight show a tendency to migrate when incorporated in this way. This can lead to "bleeding" of the fluorescent substances which may also migrate on to other materials.

When dyeing mixtures or mixed fabrics consisting of synthetic fibers or filaments of different composition and also when dyeing mixtures or mixed fabrics consisting of synthetic and natural fibers, such as acrylic fibers and wool, it is frequently found that the incorporated fluorescent substance migrates from one component of the fiber mixture to another. The consequence of this effect, which is known in the dyeing industry as "boiling over," is frequently an undesired change in the colour shade, whereby a pattern delineation is made very difficult, for example with tone-in-tone dyeings.

It is an object of the present invention to provide fluorescent polymers which are completely homogeneous and with which no "bleeding" of the fluorescent component occurs and which neither suffer a lowering of the fluorescence nor show a tendency to "boiling over" during dyeing. It is a further object of the invention to provide particularly thermostable polymers. Yet another object of the invention is to provide fluorescent mixtures having the same properties as the homogeneous polymers. Another object is to provide processes for the production of such polymers, which processes can be carried out in a simpler manner and which lead to high yields. Further objects of the invention will be apparent from the following description and from the examples.

It has now been found that the aforementioned disadvantages can be obviated and that stable fluorescent polymers and polymer mixtures can be obtained if olefinically unsaturated fluorescent compounds containing a fluorescent system and at least one olefinically unsaturated double bond are polymerized either alone or in admixture with other monomeric or polymeric vinyl compounds.

The resultant fluorescent polymers may, if desired, be subsequently mixed with non-fluorescent polymers.

It is surprising that the polymerization process of the present invention can be carried out without any difficulty, since it would be expected that the fluorescent components would inhibit the polymerization. In this connection it is known that stilbene and its derivatives act as chain-breaking agents. By using the monomers according to the invention, which are all soluble in the polymerization medium to a greater or lesser degree and which contain a polymerizable olefinic double bond, the polymerization can easily be carried out in accordance with the usual procedures employed for polymerizing olefinically unsaturated monomers.

The polymerization may take place in the manner of a homopolymerization, copolymerization of graft polymerization.

By means of the process according to the present invention it is possible to produce polymers and co-polymers which are either built up exclusively from fluorescent monomers or which are derived from one or more fluorescent monomeric components and from one or more non-fluorescent monomeric components. In addition, graft polymers can also be produced by grafting fluorescent polymerizable monomers on to a non-fluorescent polymer in a manner known per se. All these fluorescent polymers can be mixed with non-fluorescent polymers to produce fluorescent polymerization mixtures.

Suitable fluorescent polymerizable monomers for employment in the process according to the present invention are derivatives of cumarine, diphenyl pyrazoline, stilbene, naphthalic acid imide, benzimidazole, benzoxazole, and benthiazole and compounds containing triazole or oxdiazole radicals and which contain at least one of the following polymerizable radicals

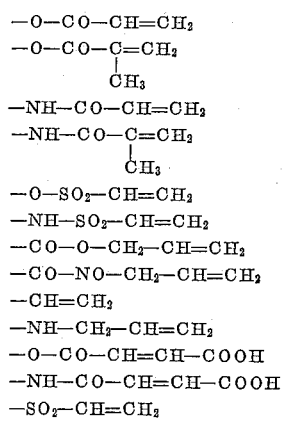

Compounds which have proved to be particularly effective for the production of fluorescent polymerizable monomers are fluoroescent amino and hydroxyl compounds which have been acylated with acrylic or methacrylic acid chlorides, such as 3-p-aminophenyl cumarine, amino and hydroxyl compounds of 4-triazolyl stilbene, more especially 4' - amino - 4 - [5" - sulphonaphtho-(1,2,4",5") - triazolyl - (2)] - stilbene - 2,2' - disulphonic acid, 4 - [7' - amino - 3',6' - disulphonaphtho - (1',2', 4,5) - triazolyl - (2)] - stilbene - 2 - sulphonic acid and 4 - (8' - hydroxy - 6 - [sulphonaphtho - (1',2',4,5) - triazolyl-(2)]-stilbene-2-sulphonic acid as well as derivatives of diphenyl pyrazoline, more especially 3-p-chloro-1,3 - diphenyl - pyrazoline sulphonic acid-(1-p)-hydroxyethylamide, -aminoethylamide, or -N-hydroxy-ethyl-N-methylaminopropylamide. In the case of the water-soluble compounds the acylation is effected by methods known per se in aqueous solution at 0–15° C. with addition of sodium hydroxide solution and while maintaining a pH value of 4-12. In the case of the water-insoluble compounds the acylation is effected in a solvent or solvent mixture, if necessary in the presence of a tertiary base. It is frequently preferable to carry out the acylation in pyridine.

As co-polymerization component there may be employed any olefinically unsaturated polymerizable compound. Particularly preferred are those from which industrially important polymers can be prepared. Examples of suitable co-polymerization components are vinyl compounds, such as styrene, styrene derivatives, vinyl chloride, vinylidene chloride, vinyl esters, acrylic and methacrylic acid, acrylonitrile, methacrylonitrile, and also diolefines, such as butadiene, isoprene, chlorobutadiene and dimethyl butadiene as well as other olefinically unsaturated compounds, such as maleic acid, fumaric acid, itaconic acid and their anhydrides, esters, semi-esters, amides and ester amides and also copolymers of maleic acid polyesters and styrene. The nature of the co-monomers is not important in the process according to the present invention.

Olefinically unsaturated polymerizable disulphonimides, such as methacrylaminobenzene-benzene sulphonimide, are also suitable as co-monomers. These compounds improve the dyeing capacity and thermostability, this being particularly important in the case of shaped articles manufactured from acrylonitrile polymers.

Initial polymers of the aforementioned vinyl compounds may be used for the graft polymerization. It is, however, also possible to use copolymers, for example of maleic acid polyesters and styrene.

The quantity of fluorescent monomers to be incorporated by polymerization according to the invention is not critical and depends only on the intended use of the final product. The fluorescent monomers are generally employed in an amount of from 1% to 100%, based on the fluorescent polymer.

The polymerization of the olefinically unsaturated fluorescent compounds either alone or in admixture with other vinyl compounds, can be carried out in the usual manner in block, solution, suspension or emulsion. When the polymerization is carried out in suspension or emulsion any of the known dispersing agents and emulsifiers may be employed, such as polyvinyl alcohols, alkyl, aryl and aralkyl sulphonates, salts of fatty acids and cation-active compounds, such as long-chain N-alkyl ammonium salts and also non-ionic emulsifiers, such as polyalkylene oxides.

As polymerization catalysts there may be employed any free-radical catalyst, for example peroxide compounds, such as hydrogen peroxide, persulphates, alkyl and aryl peroxides, hydroperoxides, diacyl peroxides, and also azo compounds, such as bis-azoisobutyronitrile as well as redox systems. Especially suitable catalysts are combinations of persulphates, such as potassium or sodium persulphate, with sulphur compounds of a low valency state, such as the alkali metal pyrosulphites, hydrogen sulphites and sulphur dioxide, if desired in the presence of small quantities of heavy metal salts, such as sulphates, chlorides or nitrates of divalent iron and copper as well as complex-forming substances, such as ethylene diamine tetra-acetic acid or a salt thereof. The method by which the polymerization is effected is not critical.

The fluorescent polymeric products of the process according to the present invention may be further processed per se, for example in order to produce shaped structures, such as fibers, foils, filaments and films. However, it is also possible for the fluorescent polymers to be incorporated into other polymers, such as polystyrene, polyethylene, polyvinyl chloride, polyesters, polyamides and polyurethanes, whereby special effects can be produced. Especially suitable for these purposes are fluorescent polymers which contain a relatively high proportion of fluorescent component. High molecular weight fluorescent compounds of this type show no tendency to migrate and thus obviate the aforementioned disadvantages described in connected with the use of low molecular weight fluorescent compounds.

The fluorescent polymers obtained by the process according to the present invention are thermostable. Thus, they can be readily mixed with polymeric substances which can be processed under thermal stressing into shaped structures, for example into fibers or filaments. Slight degrees of yellowing, such as frequently occur with thermal stressing of polymeric products, can be largely compensated for by the addition of the products of the process according to the present invention.

In order to produce certain effects, it may be preferable to use mixtures of at least two fluorescent polymerizable compounds.

Polymeric fluorescent compounds can be prepared which are soluble in water or which show emulsifying properties by incorporating hydrophilic groups, such as sulphonic acid, carboxyl and quaternary ammonium groups into the products of the present process. The resulting polymeric fluorescent compounds are suitable for use as additives to soaps, paper pulp and emulsions in order to improve the whiteness thereof. Valuable photographic products are also obtained by adding the products of the present process to gelatine. It is also possible to prepare benzene-soluble copolymers, for example with the concurrent use of acrylic acid isononyl ester, which can be employed for brightening fats or in the purification of solvents in textiles. Such compounds are also suitable for use as additives for lacquers.

By the process according to the present invention it is possible to prepare fluorescent homopolymers, copolymers or graft polymers which do not possess the disadvantages of the prior known fluorescent polymers and which only contain fluorescent compounds of low molecular weight admixed therewith. However, the fluorescent polymers which are obtained by the present process by mixing fluorescent polymers with non-fluorescent polymers, also do not show a tendency to migrate because of the high molecular weight of the fluorescent polymers. The difficulties which formerly occurred during the dyeing of mixed fabrics which contained a fluorescent component of lower molecular weight are thus obviated. An important advantage of the process according to the present invention is that the desired products are obtained in one working step. Also the fluorescent systems are particularly solidly anchored in the polymers produced by the present process.

In order that the invention may be more clearly understood the following examples are given by way of illustration only:

Example 1

1400.0 parts by volume of water, 92.0 parts by weight of acrylonitrile, 6.5 parts by weight of acryl methacrylate, 1.4 parts by weight of methacrylaminobenzene-benzene disulphonimide and 0.1 part by weight of p'-[3-p-chlorophenyl-1-pyrazolyl]-phenyl sulphonyl ethyl methacrylate of the formula

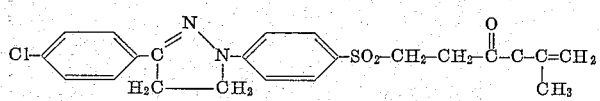

are placed in a vessel from which the air has been displaced by nitrogen.

The p'-[3-p-chlorphenol-1-pyrazolyl]-sulphonyl ethyl methacrylate was prepared by reacting acetyl aminobenzene sulphinic acid with ethylene chlorhydrin to produce β-hydroxyethyl-(p - acetylaminophenyl) - sulphone. The latter compound was hydrolyzed to the amine which was then converted into the corresponding hydrazine derivative. The hydrazine derivative was condensed with p-chlorophenyl-β-chloroethyl ketone, whereby p'-(3-p-chlorophenyl-1-pyrazolyl) - phenyl - β - hydroxyethyl sulphone having a melting point of 224° C. was produced.

This was reacted with methacrylic chloride to give p'-(3-p-chlorophenol-1-pyrazolyl)-sulphonyl ethyl methacrylate.

The clear solution is adjusted to a pH of 3 with sulphuric acid and 1.35 parts by weight of sodium pyrosulphite and 2.6 parts by weight of sodium persulphate are added to the solution, which is then heated to 50° C. Polymerization starts after a short time and is stopped after 6 hours. The polymer is filtered off on a suction filter, thoroughly washed with methanol and water and dried at 50° C. 78 parts by weight of a pure white, fine-grained powder, which shows a strong fluorescence in ultraviolet light are thus obtained.

10 parts by weight of the polymer thus recovered are extracted for 5 days with methanol and thereafter for 3 days with pyridine. Both solvents showed only a slight degree of fluorescence, whereas the fluorescent properties of the polymer remain unchanged.

5 parts by weight of the aforementioned polymer are purified by dissolving and reprecipitating 5 times from dimethyl formamide/methanol. The solvents used show only a very slight fluorescence, while the polymer continues to fluoresce without any change in ultra-violet light.

*Example 2*

Mixtures of 280 parts by weight of water, 0.22 part by weight of potassium persulphate, 0.38 part by weight of sodium pyrosulphite, 18.98 parts by weight of acrylonitrile and 1.0 part by weight of acrylic methacrylate have added thereto in each case 0.02 part by weight of the hereinafter referred to additives 1 to 9. The resulting mixtures are placed in pressure vessels which have been flushed with nitrogen and polymerization is effected as described in Example 1.

|  | Yield (in parts by weight) | Viscosity, K-value | Fluorescence |
|---|---|---|---|
| Additive: |  |  |  |
| 1 | 18.3 | 108 | Very strong. |
| 2 | 14.2 | 88 | Do. |
| 3 | 18.6 | 92 | Do. |
| 4 | 18.4 | 87 | Do. |
| 5 | 16.3 | 99 | Do. |
| 6 | 18.0 | 90 | Do. |
| 7 | 18.0 | 92 | Do. |
| 8 | 17.8 | 85 | Do. |
| 9 | 17.6 | 97 | Do. |

The yields, K-values and fluorescent properties of the products can be seen from the table.

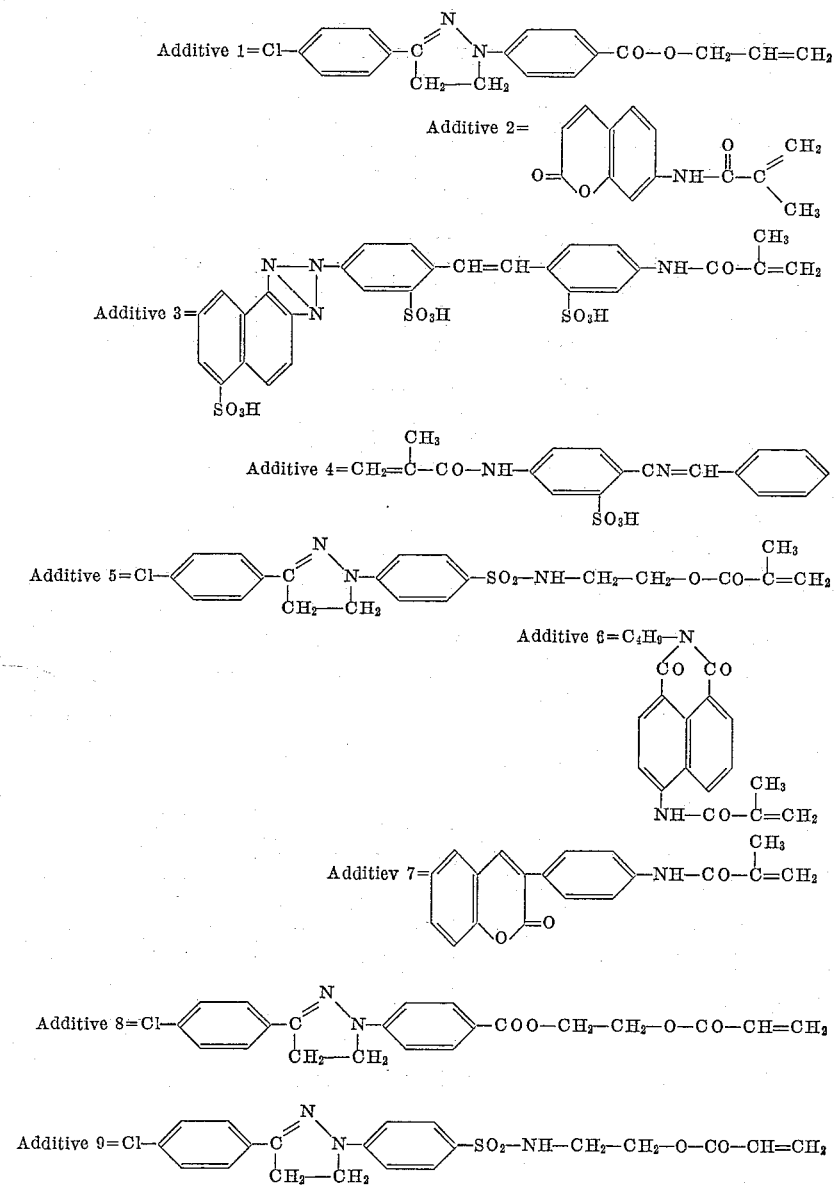

Additive 1 having a melting point of 102° C. was prepared by esterifying 3-p-chlorphenyl-1-p-carboxyphenyl pyrazoline with allyl alcohol.

Additive 2 was prepared by acylating 7-amino-cumarine with methacrylic chloride.

Additive 3 was prepared by acylating 4-amino-4'-[(5''-sulphonaphtho)-triazolyl]-stilbene-2,2'-disulphonic acid with methacrylic chloride.

Additive 4 was prepared by acylating 4-amino-stilbene-2-sulphonic acid with methacrylic chloride.

Additive 5 was prepared by acylating (3-p-chloro)-1,3-diphenyl-pyrazoline-1-p-sulphonic acid-(hydroxyethylamide) having a melting point of 171° C. with methacrylic chloride.

Additive 6 was prepared by acylating 4-amino-(N-n-butyl-1,8-naphthalimide) with methacrylic chloride.

Additive 7 was prepared by acylating (3-p-aminophenyl)-cumarine with methacrylic chloride.

Additive 8 was prepared by acylating (3-p-chloro)-1,3-diphenyl pyrazoline-carboxylic acid hydroxyethyl ester with acrylic chloride.

Additive 9 was prepared by acylating (3-p-chloro)-1,3-diphenyl-pyrazoline-1, p-sulphonic acid hydroxyethyl amide with acrylic chloride.

The pressure vessels were shaken at 50° C. for 10 hours. The polymers were thereafter suction-filtered and thoroughly washed with methanol and water. After drying at 50° C., white, fine-grain products were obtained, which fluoresce strongly in ultra-violet light. In order to test whether the polymers contained soluble quantities of fluorescent compounds, the polymers were investigated by paper chromatography in the system comprising isopropyl alcohol, acetic acid and water. For comparison purposes there were used three acrylonitrile-acryl methacrylate copolymers, to which had been added prior to polymerization 0.1% of a non-polymerizable, fluorescent compound, namely 4,4'-bis-(phenyl-ureido)-stilbene-2,2'-disulphonic acid, 3-p-chlorophenyl-1-p-sulphamidophenyl pyrazoline and 3-p-chlorophenyl-1-p-cyanophenyl pyrazoline, respectively. A strongly fluorescent spot having the $R_f$ value of the fluorescent initial substance was shown with the last-mentioned compounds on the chromatogram, all other specimens only showed a very strong fluorescence at the commencement; in no case was it possible to detect by chromatography a fluorescent starting substance which had not been incorporated by polymerization.

What we claim is:

1. A process for the production of a fluorescent polymer which comprises polymerizing an olefinically unsaturated monomer selected from the group consisting of coumarin, stilbene, pyrazoline, benzthiazole, oxdiazole and triazole, said monomer containing one $CH_2=C<$ group, in the presence of a copolymerizable compound selected from the group consisting of acrylonitrile, an acrylic acid ester and methacrylaminobenzene benzene disulfonimide and mixtures thereof, said polymerizing being carried out in an aqueous medium in the presence of a free radical catalyst.

2. A process for the production of a fluorescent polymer which comprises polymerizing an olefinically unsaturated fluorescent monomer selected from the group consisting of coumarin, stilbene, pyrazoline naphthalic acid imide, benzimidazole, benzoxazole, benzthiazole, oxdiazole and triazole, said monomer containing one $CH_2=C<$ group, in the presence of a mixture consisting of acrylonitrile, methyl acrylate, and methylacrylaminobenzene-benzene disulfonimide, said polymerization being carried out in an aqueous medium in the presence of a redox catalyst at a pH range below 7.

3. The process of claim 2 wherein said fluorescent monomer is the methacrylic ester of (1-[4-beta-hydroxyethyl-sulfonyl-phenyl]3-p-chlorphenyl)-pyrazoline.

4. The process of claim 2 wherein said fluorescent monomer is the allylic ester of (1-[4-carboxyphenyl]-3-p-chlorphenyl)-pyrazoline.

5. A synthetic polymer selected from the group consisting of a binary copolymer of acrylonitrile and a fluorescent monomer and a terpolymer of acrylonitrile, a fluorescent monomer, and another monoethylenically unsaturated comonomer, said fluorescent monomer being selected from the group consisting of coumarin, stilbene, diphenyl pyrazoline, naphthalic acid imide, oxdiazole and triazole, said fluorescent monomer having one $CH_2=C<$ group and being present in said polymer in copolymerized form in an amount from about 0.1% to about 10% by weight.

6. The product of claim 5 wherein said fluorescent monomer is the methacrylic ester of (1-[4-beta-hydroxysulfonyl-phenyl]-3-p-chlor-phenyl)-pyrazoline.

7. The product of claim 5 wherein said fluorescent monomer is the allylic ester of (1-[4-carboxyphenyl]-3-p-chlorphenyl)-pyrazoline.

8. The product of claim 5 wherein said fluorescent monomer is 7-methacryloyl-amino coumarin.

9. The product of claim 5 wherein said fluorescent monomer is 4-methacryloyl-amino-stilbene-2,2'-disulfonic acid.

10. The product of claim 5 wherein said fluorescent monomer is the methacrylic ester of (1-[4-beta-hydroxyethyl-sulfonyl-amido phenyl]-3-p-chlor-phenyl)-pyrazoline.

11. The product of claim 5 wherein said fluorescent monomer is 3-(4-methacryloyl-amino-phenyl)-coumarin.

12. The product of claim 5 wherein said fluorescent monomer is the acrylic ester of (1-[4-beta-hydroxyethyl carboxyphenyl]-3-beta-chlorphenyl)-pyrazoline.

13. The product of claim 5 wherein said fluorescent monomer is the acrylic ester of (1-[4-beta-hydroxyethyl-sulfonyl-amido-phenyl]-3-p-chlorphenyl)-pyrazoline.

14. A process for the production of a fluorescent copolymer which comprises polymerizing in the presence of a free radical catalyst an olefinically unsaturated fluorescent monomer selected from the group consisting of coumarin, stilbene, pyrazoline, naphthalic acid imide, benzimidazole, benzoxazole, benzthiazole, oxdiazole and triazole, said fluorescent monomer having one $CH_2=C<$ group, the aforesaid polymerization being conducted in the presence of a monomer selected from the group consisting of acrylonitrile, an acrylic acid ester, a methacrylic acid ester, methacrylonitrile, styrene, vinyl chloride, vinylidene chloride, a conjugated diene, and methacrylaminobenzene benzene disulfonimide, and mixtures thereof.

15. The process of claim 14 wherin said polymerization is carried out in an aqueous medium in the presence of a free radical catalyst.

References Cited by the Examiner
UNITED STATES PATENTS

| | | | |
|---|---|---|---|
| 2,657,194 | 10/53 | Toland | 260—75 |
| 2,657,195 | 10/53 | Toland | 260—75 |
| 2,732,301 | 1/56 | Robertson et al. | 96—115 |
| 2,811,443 | 10/57 | Robertson et al. | 96—115 |
| 2,967,173 | 1/61 | Fang | 96—115 |
| 3,073,699 | 1/63 | Firestine | 96—115 |

JOSEPH L. SCHOFER, *Primary Examiner.*

HAROLD N. BURSTEIN, JOSEPH R. LIBERMAN, WILLIAM H. SHORT, *Examiners.*